United States Patent [19]
Song

[11] Patent Number: 5,321,825
[45] Date of Patent: Jun. 14, 1994

[54] PROCESSING SYSTEM WITH LOCK SPACES FOR PROVIDING CRITICAL SECTION ACCESS

[75] Inventor: Seungyoon P. Song, Austin, Tex.

[73] Assignee: Advanced Micro Devices, Inc., Sunnyvale, Calif.

[21] Appl. No.: 717,036

[22] Filed: Jun. 18, 1991

[51] Int. Cl.⁵ .......................................... G06F 12/00
[52] U.S. Cl. .................................... 395/425; 395/375; 364/228.1; 364/230; 364/239.8; 364/240.1; 364/281.5; 364/284.1
[58] Field of Search ................. 395/375, 425, 725, 250

[56] References Cited

U.S. PATENT DOCUMENTS

| | | | |
|---|---|---|---|
| 3,820,079 | 6/1974 | Bergh et al. | 395/325 |
| 4,418,385 | 11/1983 | Bourrez | 395/725 |
| 4,558,411 | 12/1985 | Faber et al. | 395/800 |

Primary Examiner—P. S. Lall
Assistant Examiner—Ayni Mohamed
Attorney, Agent, or Firm—Foley & Lardner

[57] ABSTRACT

A processing system of the type including a plurality of processors for executing instructions including critical sections is arranged to permit only one processor at a time to execute a critical section. The system includes a common bus coupling the processors together, a memory for storing instructions and data operands and a lock buffer associated with each processor. The memory includes a data space defining storage locations for storing data operands of instructions in non-critical sections and a lock space defining storage locations for storing data operands of instructions in a critical section. Each lock buffer includes first and second storage locations for storing first and second control bits, is responsive to the first and second control bits having a first set of predetermined values for locking the lock space and precluding its associated processor from executing instructions which access the lock space and is responsive to the first and second control bits having a second set of predetermined values for unlocking the lock space and permitting its associated processor to execute instructions which access the lock space.

32 Claims, 3 Drawing Sheets

PROCESSING SYSTEM WITH LOCK SPACES FOR PROVIDING CRITICAL SECTION ACCESS

BACKGROUND OF THE INVENTION

The present invention generally relates to a processing system of the type including a plurality of processors coupled together on a shared bus, wherein the processors are arranged for executing program instructions from non-critical sections and at least one critical section and wherein exclusive execution of a critical section by one processor at a time is required. The present invention more particularly relates to such a processing system which is competitive coordinated and which is arranged to permit exclusive execution of a critical section by a processor without locking out the other processors from the shared bus for executing program instructions whose operands are not used by the instructions in the critical section.

Multiprocessor systems generally utilize one of two different types of coordination for permitting one processor at a time to execute a critical section. These types of coordination are referred to in the art as cooperative and competitive coordination.

In cooperative coordination, the processors are required to follow a set of protocols. The protocols typically require each processor to notify the other processors before and after the execution of a critical section. This is accomplished by busy-waiting, wherein each processor wishing to enter a critical section repeatedly tests the value of a variable associated with the critical section in a loop for an available value indicating that no other processor is currently executing the critical section. When the variable has the available value, the processor which is first to execute a read-modify-write instruction for atomically reading the available value and immediately writing the busy value of the variable enters the critical section, thereby preventing the other processors from reading the available value to preclude the other processors from entering the critical section. After completing the critical section, the processor then exits the critical section by writing the available value to permit another processor to acquire the variable in the same manner as described above.

Cooperative coordination works only if all processors involved strictly follow the protocol. A malicious or inadvertent violation of the protocol will result in improper functioning of the processing system. Hence, the usefulness of cooperative coordination is limited to trusting environments, such as within a processing system executing a single parallel program which has been written with extreme care.

In competitive coordination, there is no prearranged protocol among the processors. Competitive coordination is thus required in situations where it is difficult or impractical to define the protocols necessary for cooperative coordination. It is all generally easier to implement.

To support competitive coordination, shared bus architectures utilize bus locking. Before a processor enters a critical section, requiring the use of a shared resource, it locks the bus to be free to use the bus while the other processors are denied the use of the bus. The processor locking the bus maintains the locking of the bus until it completes the critical section or until there is a time out, in those systems which provide such a time out mechanism.

To provide bus locking, each processor of a competitive coordinated processing system includes a status register for storing a bit which controls the bus locking. Once this bit is set by a bus locking processor and the bus is acquired, the bus is not released until the bit in the register is cleared.

The bus locking approach has a detrimental side effect in that it effectively halts all but one processor from executing while the bus is locked. Hence, bus locking is useful only in situations where performance is of secondary concern or where the bus locking period is short.

As well known in the art, programs execute in one of the two modes: supervisor or user. Programs in the supervisor mode are permitted to execute any and all instructions the processors are capable of executing. In contrast, programs in the user mode are permitted to execute only a limited set of instructions. This distinction is based o the assumption that the programs run in the supervisor mode are written by the developer of the computer system, whereas the programs run in the user mode are written by users of the processing system. The restrictiveness in the user mode is for the purpose that a programming mistake made by one user does not affect other users.

Most processing system designs do not provide bus locking for the user mode programs. For those processing systems which do provide bus locking for the user mode programs, bus locking is made possible only with severe restrictions.

The present invention provides an improved competitive coordinated processing system which overcomes the deficiencies of such prior art competitive coordinating processing systems. The processing system of the present invention provides exclusive access to a critical section by a processor without locking out the other processors from the shared bus for executing instructions accessing data operands other than data operands used by the critical section. In addition, exclusive access to a critical section is provided to a processor by the present invention without the restrictions imposed by prior art systems such as the previously described bus locking system.

SUMMARY OF THE INVENTION

The present invention provides a processing system of the type including a plurality of processors for executing program instructions including program instructions of a critical section and a non-critical section. The processing system is arranged to permit only one processor to execute the critical section at a time and includes memory means for providing the processors with program instructions and data operands. The memory means include a data space for storing data operands used by the instructions in the non-critical section and a lock space for storing data operands used by the instructions in the critical section. The processing system further includes a common bus coupling the processors together and to the memory means and lock buffer means associated with each processor. Each lock buffer means is responsive to a processor associated with another one of the lock buffers executing the critical section for locking the lock space from its associated processor for precluding its associated processor from executing only instructions which access the data operands in the lock space.

The present invention further provides a processing system of the type including a plurality of processors for executing program instructions including program instructions of a critical section and a non-critical section, wherein the execution of program instructions of the critical section requires exclusive execution by one of the processors at a time. The processing system is arranged to permit only one processor to execute the critical section at a time and includes memory means for providing the processors with program instructions and data operands. The memory means includes a critical section instruction space for storing program instructions of the critical section, a non-critical section instruction space for storing program instructions of the non-critical section, a data space for storing data operands used by the instructions in the non-critical section, and a lock space for storing data operands used by the instructions in the critical section. The processing system further includes a common bus coupling the processors together and to the memory means and lock buffer means associated with each processor. Each lock buffer means includes first and second storage locations for storing first and second control bits, and is responsive to the first and second control bits having a first set of predetermined values for precluding its processor from executing only program instructions that use the data operands stored in the lock space.

The present invention further provides a method for use in a processing system of the type including a plurality of processors for executing program instructions including program instructions of a critical section and a non-critical section, wherein the execution of program instructions of the critical section requires exclusive execution by one of the processors at a time. The method permits only one processor at a time to execute the critical section and includes the steps of providing memory means having a critical section instruction space with program instructions of the critical section stored therein, a non-critical section instruction space with program instructions of the non-critical section stored therein, a data space with data operands of instructions in the non-critical section stored therein, and a lock space with data operands of instructions in the critical section stored therein. The method further includes providing a common bus, coupling the processors together and to the memory means over the common bus, and providing lock buffer means associated with each processor wherein each lock buffer means includes first and second storage locations for storing first and second control bits. The method further includes the steps of precluding a processor from executing only program instructions that use data operands stored in the lock space if the first and second control bits stored in its associated lock buffer means have a first set of predetermined values, and enabling a processor to execute program instructions that use data operands stored in the lock space if the first and second control bits stored in its associated lock buffer means have a second set of predetermined values.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in the several figures of which like reference characters identify identical elements, and wherein:

DETAILED DESCRIPTION OF THE PREFERRED EMBODIMENT

Figure 1:
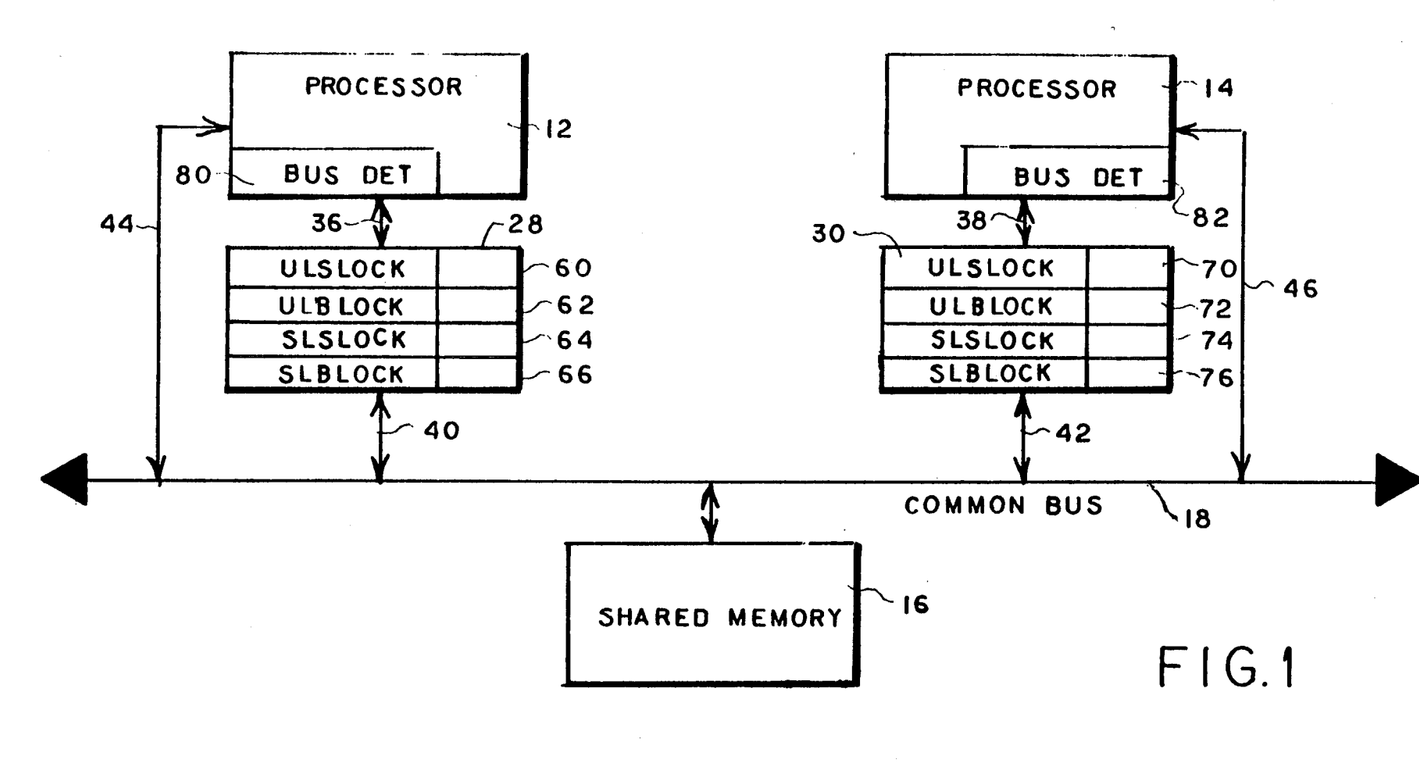
FIG. 1 is a block diagram illustrating a competitive coordinated processing system embodying the present invention.

Referring now to FIG. 1, it illustrates, in block diagram form, a processing system 10 embodying the present invention. The processing system 10 generally includes a first processor 12, a second processor 14, and memory means comprising a shared memory 16. The processors 12 and 14 are coupled together and to the shared memory 16 by a common bus 18. As will be appreciated hereinafter, the processing system 10 may incorporate additional processors for implementing the present invention to advantage and that only a pair of processors are illustrated so as to not unduly complicate the description of the preferred embodiment of the present invention.

Each of the processors 12 and 14 is associated with a lock buffer 28 and 30. The processors 12 and 14 are coupled to the lock buffers 28 and 30 by bi-directional buses 36 and 38 respectively. The lock buffers 28 and 30 are coupled to the common bus 18 by bi-directional buses 40 and 42 respectively and the processors 12 and 14 are further coupled directly to the common bus 18 by bi-directional buses 44 and 46 respectively.

The processors 12 and 14 are arranged for executing program sections consisting of instructions obtained from the shared memory 16 which will be described subsequently with reference to FIG. 2. The program sections include critical sections and non-critical sections. Critical sections are program sections which require exclusive execution by one of the processors at a time. Non-critical sections are program sections which may be executed by more than one processor at a time. As will be seen herein after, the processing system 10 permits the processors 12 and 14 to execute critical and non-critical sections from both the user space in the shared memory 16 and the supervisor space in the shared memory 16.

The bi-directional buses 44 and 46 permit the processors 12 and 14 to address the shared memory 16 for addressing the program instructions stored therein, for receiving the program instructions from the shared memory 16, and for executing program instructions which do not access data operands in the user lock space or in the supervisor lock space.

Each of the lock buffers 28 and 30 include a plurality of storage locations, with lock buffer 28 including storage locations 60, 62, 64, and 66 and lock buffer 30 including storage locations 70, 72, 74, and 76. Each of the storage locations 60, 62, 64, 66, 70, 72, 74, and 76 is arranged to contain a control bit having a logical zero or logical one value. Storage locations 60 and 70 are arranged for storing a user lock space lock control bit, storage locations 62 and 72 are arranged for storing a user lock buffer lock control bit, storage locations 64 and 74 are arranged for storing a supervisor lock space lock control bit, and storage locations 66 and 76 are arranged for storing a supervisor lock buffer lock control bit. Storage locations 60 and 62 and storage locations 70 and 72 form a part of the user lock space to be described hereinafter and are utilized for permitting a processor to execute user lock or unlock instructions or read-lock or write-lock instructions accessing data operands stored in the user lock space of shared memory 16. Storage locations 64 and 66 and storage locations 74 and 76 form a part of the supervisor lock space to be described hereinafter and are utilized for permitting a processor to execute supervisor lock or unlock instructions or read-lock or write-lock instructions accessing data operands stored in the supervisor lock space of shared memory 16. As a result, all such instructions must be executed by processors 12 and 14 through their associated lock buffers 28 and 30.

Figure 2:
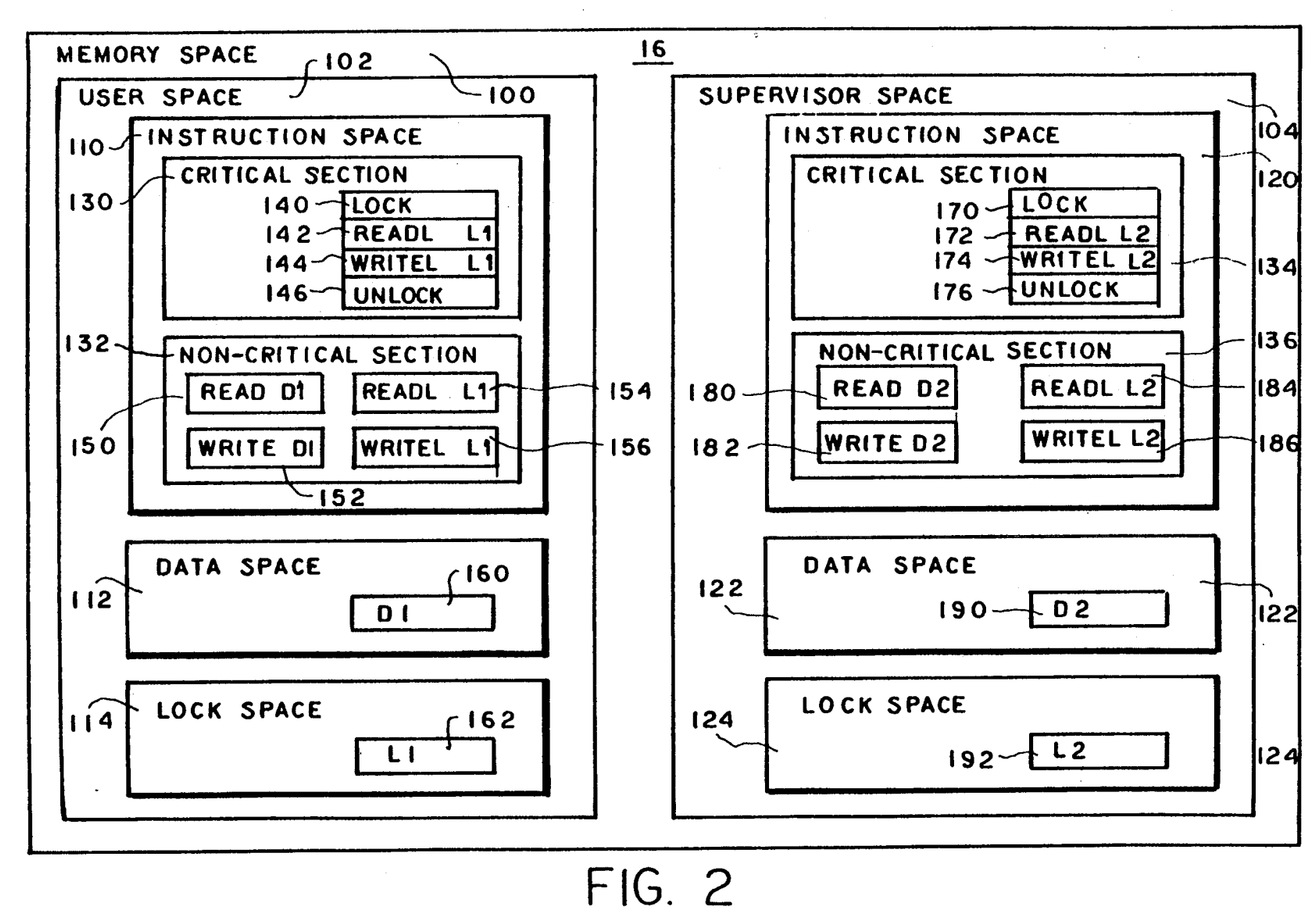
FIG. 2 is a diagrammatic illustration of a shared memory which may be utilized in the processing system of FIG. 1 in accordance with the present invention.

Referring now to FIG. 2, it diagrammatically illustrates the conceptual configuration of the shared memory 16 of the processing system 10 of FIG. 1. The shared memory 16 includes a memory space 100 which is subdivided into a user space 102 and a supervisor space 104. The user space 102 includes an instruction space 110, a data space 112, and a lock space 114. Similarly, the supervisor space 104 includes an instruction space 120, a data space 122, and a lock space 124. The user instruction space 110 includes a critical section 130 and a non-critical section 132. Similarly, the supervisor instruction space 120 includes a critical section 134 and a non-critical section 136.

The critical sections 130 and 134 include program instructions which are required for executing the critical sections. For example, the user critical section 130 includes lock instruction 140, read-lock instruction 142, write-lock instruction 144, and unlock instruction 146. Similarly, the supervisor critical section 134 includes a lock instruction 170, a read-lock instruction 172, a write-lock instruction 174, and an unlock instruction 176. As will be noted in the figure, the read-lock instruction 142 and the write-lock instruction 144 require the data operand stored at storage location 162 of the lock space 114. Similarly, the read-lock instruction 172 and the write-lock instruction 174 require the data operand stored at storage location 192 of the lock space 124. As previously mentioned, the storage locations 60 and 62 of lock buffer 28 and the storage locations 70 and 72 of lock buffer 30 form a part of the user lock space 114 and the storage locations 64 and 66 of lock buffer 28 and the storage locations 74 and 76 of lock buffer 30 form a part of the supervisor lock space 124. Any time one of the processors 12 or 14 executes an instruction to either the user lock space 114 or the supervisor lock space 124, it must do so through its associated lock buffer which determine whether the processor will be permitted to execute the instruction in a manner to be described hereinafter.

The non-critical section 132 of the user instruction space 110 includes a read instruction 150, a write instruction 152, a read-lock instruction 154, and a write-lock instruction 156. The non-critical section 132 defines program instructions which may be executed by more than one processor at a time. However, it will be noted that read-lock instruction 154 and write-lock instruction 156 require the data operand stored in storage location 162 of the lock space 114. As a result, when one of the processors executes either the read-lock instruction 154 or the write-lock instruction 156, it does so through its associated lock buffer because those instructions require data operand contained within the user lock space 114.

Similarly, the supervisor non-critical section 136 of the supervisor instruction space 120 includes a read instruction 180, a write instruction 182, a read-lock instruction 184, and a write-lock instruction 186. The non-critical section 136 defines program instructions which may be executed by more than one processor at a time. However, it will also be noted that the read-lock instruction 184 and the write-lock instruction 186 require data operand contained at storage location 192 of the supervisor lock space 124. As a result, if one of the processors executes either the read-lock instruction 184 or the write-lock instruction 186, it must do so through its associated lock buffer.

The values of the bits stored in storage locations 60 and 62 determine whether the processor 12 is permitted to execute instructions whose operands are from the user lock space 114. These instructions correspond to the instructions 140, 142, 144, 146 within the critical section 130 and the instructions 154 and 156 within the non-critical section 132. The values of the bits stored in storage locations 64 and 66 determine whether processor 12 is permitted to execute instructions whose operands are from the supervisor lock space 124. These instructions correspond to the instructions 170, 172, 174, 176 within the critical section 134 and the instructions 184 and 186 within the non-critical section 136. Similarly, the values of the bits stored in storage locations 70 and 72 determine whether the processor 14 is permitted to execute instructions whose operands are from the user lock space 114. These instructions correspond to the instructions 140, 142, 144, 146 within the critical section 130 and the instructions 154 and 156 within the non-critical section 132. The values of the bits stored in storage locations 74 and 76 determine whether processor 14 is permitted to execute instructions whose operands are from the supervisor lock space 124. These instructions correspond to the instructions 170, 172, 174, 176 within the critical section 134 and the instructions 184 and 186 within the non-critical section 136.

When a processor wishes to enter one of these critical sections, it conveys a lock instruction to its corresponding lock buffer. If the first and second control bits have a second set of predetermined values, of, for example, logical zeros, the associated lock buffer permits its processor to perform the lock instruction by providing its associated processor with access to the common bus 18 over the bi-directional buses 40 or 42. If the first and second control bits have a first set of predetermined values, of, for example, logical ones, the associated lock buffer precludes its processor from executing the lock instruction and thereby causes its associated processor to stall. The lock buffer precludes its associated processor from executing its lock instruction because the logical one values of the first and second control bits indicate that another processor has currently locked the lock space in the process of executing the same critical section. When a processor is permitted to execute the lock instruction by its associated lock buffer, the processor will write into its lock buffer a third set of predetermined values including a value of logical one for the first control bit and a value of logical zero for the second control bit. This indicates to the lock buffer that its associated processor is in the process of executing a critical section and that the lock space is not locked to its processor. Hence its processor is granted access to the appropriate lock space and the common bus 18 to thereby be permitted to execute the critical section.

All instructions requiring data operands from one of the two lock spaces are conveyed from the processors to their associated lock buffers. This permits the lock buffers to either allow its processor to execute the instruction or to preclude its associated processor from executing the instructions should another processor be in the process of executing the respective critical section. In this manner, when a processor is executing a critical section, the other processors are locked out of the appropriate lock space and precluded from executing an instruction which requires the use of the lock space. However, the other processors are not locked out from the other lock space or any of the data spaces for executing instructions in non-critical sections or instructions requiring data operands in the other lock space. As a result, even though a processor may be executing a critical section and thus has locked a lock space, the other processors are permitted to execute instructions which require operands from a data space or the other unlocked lock space. The common bus is thus accessible to the other processors for continued execution.

As will also be noted in FIG. 1, the processors 12 and 14 includes a bus detector 80 and 82 respectively. The bus detectors 80 and 82 are provided for detecting the availability of the common bus 18 when its associated processor is to execute either a lock instruction or an unlock instruction. Before a processor executes one of their instructions, for example, a lock or unlock instruction, its associated bus detector must first detect the availability of the common bus. If a processor is to execute a lock instruction and its associated lock buffer contains the first and second control bits having the second set of values (both logical zeros) the processor causes its bus detector to detect for the availability of the bus. While the bus detector is detecting for the availability of the bus, the processor continuously monitors the values of the first and second control bits. If before the bus becomes available the first and second control bits change in value to the first set of predetermined values (both logical ones) the processor will cause its bus detector to terminate detecting for the availability of the bus and the processor will go into a stall condition to wait until the first and second control bits change back to the second set of predetermined values of logical zeros.

As thus can be seen, when a first processor wishes to enter a critical section and is permitted by its lock buffer to execute the lock instruction, should a second processor be granted the bus for the execution of the lock instruction before the first processor is granted the bus, the first processor will stall and the second processor will enter its critical section by executing the lock instruction.

Figure 3:
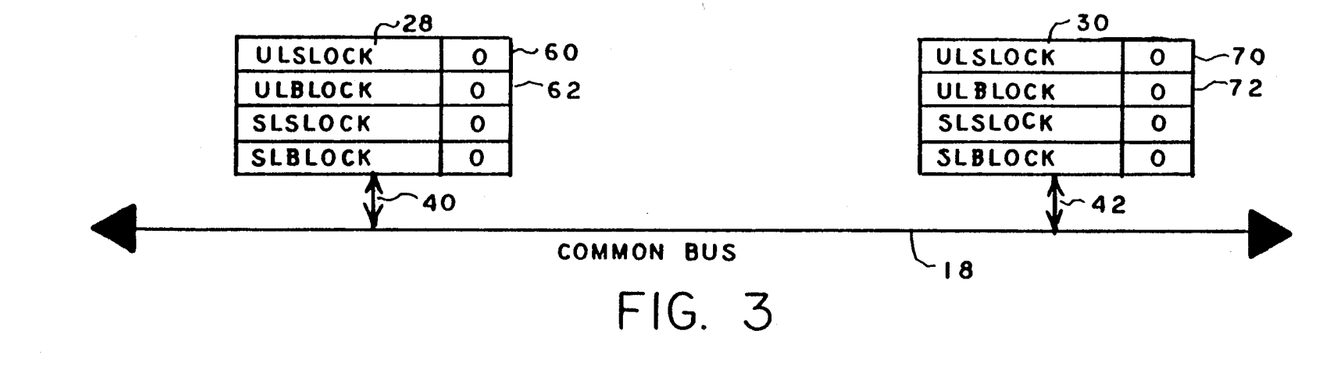
FIG. 3 is a block diagram illustrating the condition of the lock buffers of the processing system of FIG. 1 prior to the entering of a critical section by one of the processors.
Figure 4:
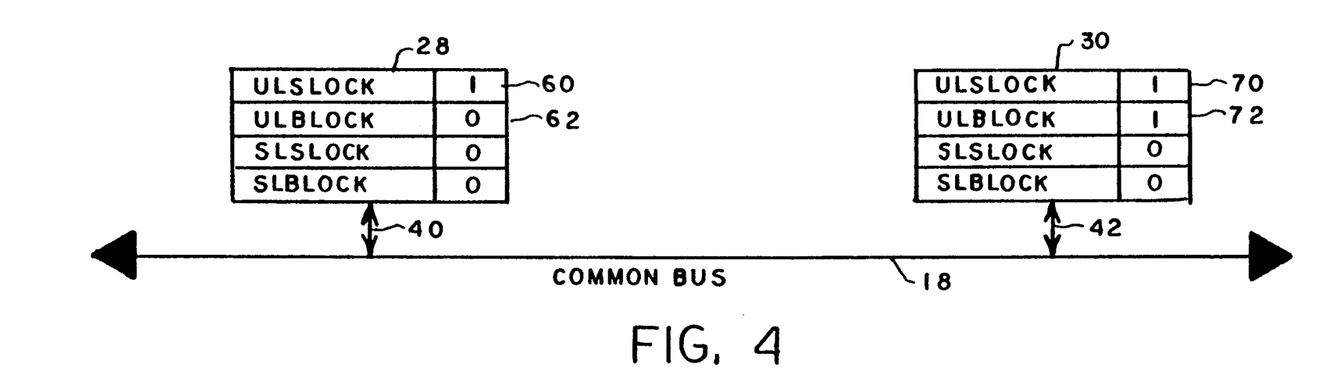
FIG. 4 is a block diagram illustrating the condition of the lock buffers of the processing system of FIG. 1 after a processor has entered a critical section.

The operation of the processing system 10 for controlling accesses to critical sections will now be described with respect to processor 12 entering and completing a critical section from the user space 102 of shared memory 16. The operation of the processing system 10 for controlling accesses to critical sections in the supervisor space 104 is identical so that only the operation of the processing system for controlling accesses to a critical section in the user space by processor 12 will be described herein. Reference to FIGS. 3 and 4 may be made during this discussion which illustrate the condition of the lock buffers 28 and 30 during the process of processor 12 entering and completing a critical section.

Initially, the first and second control bits stored in storage locations 60 and 62 of lock buffer 28 and stored in storage locations 70 and 72 of lock buffer 30 have the second set of predetermined values of logical zeros. When the processor 12 conveys a lock instruction to its lock buffer 28, the lock buffer 28 will permit the processor 12 to begin the execution of the lock instruction because the first and second control bits stored in storage locations 60 and 62 are both logical zeros. The processor 12 then causes its bus detector 80 to detect the availability of the common bus 18. If the values of the first and second control bits stored in storage locations 60 and 62 change to the first set of predetermined values of logical ones before the bus detector 80 detects the availability of the common bus 18, the processor 12 will stall and not execute the lock instruction because another processor must have been granted the common bus to execute its lock instruction before processor 12 was able to obtain the common bus.

If the bus detector 80 detects the availability of the common bus 18 before the values of the first and second control bits stored in storage locations 60 and 62 change to the first set of predetermined values of logical ones, the processor 12 is then granted the common bus 18 by its lock buffer 28 over the bi-directional bus 40. The processor 12 then causes the lock buffer 28 to write the first set of predetermined values of the first and second control bits to the lock buffers associated with other processors of the processing system. This condition is shown in FIG. 4 wherein processor 12 has written into storage locations 70 and 72 of lock buffer 30 the first set of predetermined values for the first and second control bits of logical ones. Concurrently therewith, the processor 12 writes into its lock buffer 28 at storage locations 60 and 62 the third set of values for the first and second control bits wherein the third set of values are a logical one for the first control bit stored in storage location 60 and a logical zero for the second control bit stored in storage location 62.

With the lock buffers 28 and 30 conditioned as illustrated in FIG. 4, during the time in which the processor 12 is processing its critical section, processor 14 is prevented from executing instructions that access the user lock space by its lock buffer 30 since the first and second control bits stored in storage locations 70 and 72 have the first set of values of logical ones. Processor 12 is permitted to execute its critical section by its lock buffer 28 because its lock buffer includes a first control bit stored in storage location 60 of a logical one and a second control bit stored in its storage location 62 of a logical zero. This indicates to the lock buffer 28 that its processor is the current owner of the user lock space 114 and that all other processors are locked out from executing instructions that access this space.

Even though processor 14 is locked out of the user lock space 114, it is still permitted to execute instructions that do not access the user lock space 114 over the common bus 18. To be specific, the instructions that access the user data space 112 or the supervisor data space 122 (such instructions are 150, 152, 180, 182) are allowed to proceed since they are not controlled by the lock buffers. Only the instructions that access the user lock space 114 or the supervisor lock space 124 (such instructions are 140, 142, 144, 146, 154, 156, 170, 172, 174, 176, 184, 186) are controlled by the lock buffers. Of these instructions, the processor 14 is prevented from executing the instructions that access the user lock space by its lock buffer (such instructions are 140, 142, 144, 146, 154, 156). The processor 14 is able to execute the instructions 150, 152, 170, 172, 174, 176, 180, 182, 184, 186. As a result, processing efficiency is maintained even though a processor is currently executing a critical section in the user space 102 because the common bus 18 is not locked out from the other processors for the execution of instructions not accessing the user lock space 114.

When processor 12 completes its critical section, it will execute an unlock instruction for unlocking the lock buffers associated with the other processors. The processor 12 before executing its unlock instruction first causes its bus detector 80 to detect for the availability of the bus 18. When the common bus becomes available, the processor 12 causes its lock buffer 28 to write the second set of values for the first and second control bits to the lock buffers associated with all other processors. Concurrently therewith, processor 12 writes the second set of values of the first and second control bits to its own lock buffer 28. This once again places the lock buffers into the condition illustrated in FIG. 3 wherein the processor 12 has caused logical zeros to be written into storage locations 70 and 72 of lock buffer 30 and logical zeros into storage locations 60 and 62 of its associated lock buffer 28.

If, during the time in which processor 12 was executing its critical program section, processor 14 wished to enter a critical section, it would have been stalled by its lock buffer 30. However, now that processor 12 has unlocked lock buffer 30 associated with processor 14, processor 14 may now be permitted by its associated lock buffer 30 to execute its lock instruction for entering a critical section in the user space 102 in a manner as described above with respect to processor 12. The processor 14 is also able to execute instructions that are not a part of a critical section but access the user lock space 114. Such instructions are 154 and 156.

In accordance with this preferred embodiment, each pair of processors and lock buffers are preferably integrated together within a single integrated circuit. However, as will be appreciated by those skilled in the art, the lock buffers may be integrated separately from their associated processors without departing from the present invention.

From the foregoing, it can be seen that the present invention provides a new and improved processing system which is competitive coordinated for controlling accesses to critical sections by its processors. The entering of critical sections is permitted without locking the bus so that when a processor is executing a critical section in the user (or the supervisor) space, all other processors are free to execute program instructions that do not access the user (or the supervisor) lock space. In addition, since providing exclusive access to the user lock space (by locking it) to a processor executing program instructions in the user space does not prevent other processors from executing program instructions that do not access the user lock space, the processing system of the present invention provides competitive coordination to processors executing program instructions in the user space without any restrictions.

While a particular embodiment of the present invention has been shown and described, modifications may be made, and it is therefore intended to cover in the appended claims all such changes and modifications which fall within the true spirit and scope of the invention.

What is claimed is:

1. A processing system of the type including a plurality of processors for executing program instructions including program instructions of a critical section and a non-critical section, wherein the execution of program instructions of said critical section requires exclusive execution by one of said processors at a time, said processing system being arranged to permit only one said processor to execute said critical section at a time and comprising:

memory means for providing said processors with program instructions and data operands, said memory means including a critical section instruction space for storing program instructions of said critical section, a non-critical section instruction space for storing program instructions of said non-critical section, a data space for storing data operands of the instructions in said non-critical section, and a lock space for storing data operands of the instructions in said critical section;

a common bus coupling said processors together and to said memory means; and lock buffer means coupled with each said processor, each said lock buffer means including first and second storage locations for storing first and second control bits, each said lock buffer means being responsive to said first and second control bits having a first set of predetermined values for precluding its associated processor from executing only program instructions that require data operands stored in said lock space, each said lock buffer means being responsive to said first and second control bits having a second set of predetermined values for permitting its associated processor to execute program instructions that require data operands stored in said lock space of said memory means.

2. A processing system as defined in claim 1 wherein each said processor is arranged for executing a lock instruction from said critical section instruction space of said memory means for writing, over said common bus, said first set of predetermined values of said first and second control bits to each said lock buffer means associated with the other said processors before entering said critical section from said critical section instruction space.

3. A processing system as defined in claim 2 wherein each said processor is arranged for writing a third set of predetermined values of said first and second control bits to its associated lock buffer means while executing said lock instruction.

4. A processing system as defined in claim 3 wherein each said processor includes bus detecting means for detecting the availability of said common bus.

5. A processing system as defined in claim 4 wherein each said processor is responsive to its said bus detecting means detecting that said common bus is available before executing said lock instruction.

6. A processing system as defined in claim 5 wherein each said processor is arranged to monitor said values of said first and second control bits stored in its associated lock buffer means while its said bus detecting means detects the availability of said common bus and wherein each said processor is arranged for suspending the execution of said lock instruction in response to detecting that said values of said first and second control bits stored in its associated lock buffer means have changed to said first set of values prior to said bus detecting means detecting that said common bus is available.

7. A processing system as defined in claim 6 wherein each said processor is arranged for executing an unlock instruction from said critical section instruction space of said memory means for writing, over said common bus, said second set of predetermined values of said first and second control bits to said lock buffer means associated with the other said processors upon completing said critical section from said critical section instruction space.

8. A processing system as defined in claim 7 wherein each said processor is arranged for writing said second set of predetermined values of said first and second control bits to its associated lock buffer means while executing said unlock instruction.

9. A processing system as defined in claim 8 wherein each said processor is responsive to its said bus detecting means detecting that said common bus is available before executing said unlock instruction.

10. A processing system as defined in claim 9 wherein said first set of predetermined values is said first control bit being a logical one and said second control bit being a logical one.

11. A processing system as defined in claim 10 wherein said second set of predetermined values is said first control bit being a logical zero and said second control bit being a logical zero.

12. A processing system as defined in claim 11 wherein said third set of predetermined values is said first control bit being a logical one and said second control bit being a logical zero.

13. A method for use in a processing system of the type including a plurality of processors for executing program instructions including program instructions of a critical section and a non-critical section, wherein the execution of program instructions of said critical section requires exclusive execution by one of said processors at a time, said method permitting only one said processor at a time to execute said critical section and comprising the steps of:
providing memory means having a critical section instruction space with program instructions of said critical section stored therein, a non-critical section instruction space with program instructions of said non-critical section stored therein, a data -space with data operands of said instructions in said non-critical section instruction space stored therein, and a lock space with data operands of said instructions in said critical section instruction space stored therein;
providing a common bus;
coupling said processors together and to said memory means over said common bus;
providing lock buffer means coupled with each said processor, each said lock buffer means including first and second storage locations for storing first and second control bits,
precluding a processor from executing only program instructions that require data operands stored in said lock space if said first and second control bits stored in its associated lock buffer means have a first set of predetermined values;
enabling a processor to execute program instructions that require data operands stored in said lock space if said first and second control bits stored in its associated lock buffer means have a second set of predetermined values, and
executing a lock instruction from said critical section instruction space by one of said processors by writing from said one processor, over said common bus, said first set of predetermined values of said first and second control bits to each said lock buffer means associated with the other said processor to thereby enter a critical section in said critical section instruction space.

14. A method as defined in claim 13 comprising the further steps of writing a third set of predetermined values of said first and second control bits from said one processor to its associated lock buffer means while executing said lock instruction.

15. A method as defined in claim 14 comprising the further steps of detecting that said common bus is available before executing said lock instruction.

16. A method as defined in claim 15 comprising the further steps of monitoring said values of said first and second control bits stored in said lock buffer means associated with said one processor while detecting for the availability of said common bus and terminating the execution of said lock instruction if said first and second control bits change to said first set of values prior to detecting that said common bus is available.

17. A method as defined in claim 16 comprising the further steps of executing an unlock instruction from said critical section instruction space by said one processor by writing, from said one processor over said common bus, said second set of predetermined values of said first and second control bits to said lock buffer means associated with the other said processors upon completing said critical section in said critical section instruction space.

18. A method as defined in claim 17 comprising the further steps of writing said second set of predetermined values of said first and second control bits from said one processor to its associated lock buffer means while executing said unlock instruction.

19. A method as defined in claim 18 comprising the further steps of detecting that said common bus is available before executing said unlock instruction.

20. A method as defined in claim 19 wherein said first set of predetermined values is said first control bit being a logical one and said second control bit being a logical one.

21. A method as defined in claim 20 wherein said second set of predetermined values is said first control bit being a logical zero and said second control bit being a logical zero.

22. A method as defined in claim 21 wherein said third set of predetermined values is said first control bit being a logical one and said second control bit being a logical zero.

23. A processing system of the type including a plurality of processors for executing program instructions including program instructions of a critical section and a non-critical section, said processing system being arranged to permit only one said processor to execute said critical section at a time and comprising:
memory means for providing said processors with program instructions and data operands, said memory means including a critical section instruction space for storing said program instructions of critical section, a non-critical section instruction space for storing said program instructions of said non-critical a data space for storing data operands of instructions in said non-critical section and a lock space for storing data operands of instructions in said critical section;

a common bus coupling said processors together and to said memory means; and lock buffer means coupled with each said processor, each said lock buffer means being responsive to a processor associated with another one of said lock buffers executing said critical section for locking said lock space from its associated processor for precluding its associated processor from executing only instructions which access said lock space, each of said lock buffers including first and second storage locations for storing first and second control bits, each said lock buffer means being responsive to said first and second control bits having a first set of predetermined values for locking said lock space from its associated processor for precluding its associated processor from executing instructions which access said lock space.

24. A processing system as defined in claim 23 wherein each said lock buffer means is responsive to said first and second control bits having a second set of predetermined values for unlocking said lock space and permitting its associated processor to execute instructions which access said lock space.

25. A processing system as defined in claim 24 wherein each said processor is arranged for executing a lock instruction for writing, over said common bus, said first set of predetermined values of said first and second control bits to each said lock buffer means associated with the other said processors before entering said critical section.

26. A processing system as defined in claim 25 wherein each said processor is arranged for writing a third set of predetermined values of said first and second control bits to its associated lock buffer means while executing said lock instruction.

27. A processing system as defined in claim 26 wherein each said processor includes bus detecting means for detecting the availability of said common bus.

28. A processing system as defined in claim 27 wherein each said processor is responsive to its said bus detecting means detecting that said common bus is available before executing said lock instruction.

29. A processing system as defined in claim 28 wherein each said processor is arranged to monitor said values of said first and second control bits stored in its associated lock buffer means while its said bus detecting means detects the availability of said common bus and wherein each said processor is arranged for suspending the execution of said lock instruction in response to detecting that said values of said first and second control bits stored in its associated lock buffer means have changed to said first set of values prior to said bus detecting means detecting that said common bus is available.

30. A processing system as defined in claim 24 wherein each said processor is arranged for executing an unlock instruction for writing, over said common bus, said second set of predetermined values of said first and second control bits to said lock buffer means associated with the other said processors upon completing said critical section.

31. A processing system as defined in claim 30 wherein each said processor is arranged for writing said second set of predetermined values of said first and second control bits to its associated lock buffer means while executing said unlock instruction.

32. A processing system as defined in claim 31 wherein each said processor includes bus detecting means for detecting the availability of said common bus and is responsive to its said bus detecting means detecting that said common bus is available before executing said unlock instruction.

* * * * *